United States Patent [19]
Levy et al.

[11] Patent Number: 5,190,285
[45] Date of Patent: Mar. 2, 1993

[54] ELECTRONIC GAME HAVING INTELLIGENT GAME PIECES

[75] Inventors: Robert B. Levy, Morrisville, Pa.; Fred W. Verdi, Lawrenceville, N.J.

[73] Assignee: AT&T Bell Laboratories, Murray Hill, N.J.

[21] Appl. No.: 767,585

[22] Filed: Sep. 30, 1991

[51] Int. Cl.$^5$ .................................................. A63F 9/24
[52] U.S. Cl. ................................. 273/85 G; 273/237; 273/434; 273/88
[58] Field of Search ............ 273/237, 238, 239, 85 G, 273/433, 434, 435, DIG. 28, 88

[56] References Cited

U.S. PATENT DOCUMENTS

| | | | |
|---|---|---|---|
| 4,195,838 | 4/1980 | Santandrea et al. | 273/88 |
| 4,210,335 | 7/1980 | Licciardi | 273/238 |
| 4,672,541 | 6/1987 | Bromley et al. | 273/88 |
| 4,692,604 | 9/1987 | Billings | 235/493 |
| 4,820,233 | 4/1989 | Weiner | 434/308 |
| 4,824,106 | 4/1989 | Ueda et al. | 273/1 E |
| 4,840,382 | 6/1989 | Rubin | 273/237 |
| 4,858,930 | 8/1989 | Sato | 273/434 |
| 4,922,420 | 5/1990 | Nakagawa et al. | 364/410 |
| 4,958,837 | 9/1990 | Russell | 273/237 |
| 4,984,193 | 1/1991 | Nakagawa | 364/900 |
| 5,026,058 | 6/1991 | Bromley | 273/88 |
| 5,067,079 | 11/1991 | Smith, III et al. | 273/88 |

Primary Examiner—Jessica J. Harrison
Attorney, Agent, or Firm—R. B. Levy

[57] ABSTRACT

An electronic game (10) is provided with at least one, and preferably a plurality, of intelligent game pieces (14,14') which each contain a re-programmable memory device (30,70). The memory device (30,70) in each of the game pieces (14 and 14', respectively), stores characteristics of an activity to be simulated by the game (10). By re-programming the game pieces (14,14'), the characteristics of the activity simulated by the game (10) can be changed to make the activity more interesting and challenging.

22 Claims, 4 Drawing Sheets

ELECTRONIC GAME HAVING INTELLIGENT GAME PIECES

TECHNICAL FIELD

This invention relates to an electronic game, and more particularly, to an electronic game for simulating a sport such as baseball or the like.

BACKGROUND OF THE INVENTION

There now exist electronic games which display images (and produce sound) on a television set. Such games, known as "video games," are commonplace in many homes. The typical video game is generally comprised of a "console" (i.e., a control unit) which contains circuitry for executing a set of program instructions, generally contained in one or more memory devices, packaged within a game cartridge connected to the console. The program instructions, when executed, cause the circuitry within the console to simulate an activity (i.e., play a game) by producing images and sound for reproduction by the television set. One or more players typically interact with the console circuitry via a control, typically known as a joystick, to play the simulated game. By inserting a different game cartridge into the console, a different activity can be simulated.

One significant drawback of present day video games is that the characteristics of the activity (e.g., the play of the game), established by the program instructions in the game cartridge, remain the same. While a particular game may have several different levels of difficulty, the playing characteristics within each level are invariant. As a consequence, once a player has mastered the highest degree of difficulty of a particular game, the player will often lose interest in that game.

Thus, there is a need for an electronic game whose characteristics can be easily altered.

SUMMARY OF THE INVENTION

Briefly, in accordance with a preferred embodiment, an electronic game is provided which affords the opportunity to change the playing characteristics of an activity (game) simulated by the game. The electronic game includes at least one, and preferably, a plurality of "intelligent" game pieces, each containing at least one re-programmable semiconductor memory device, initially programmed with a set of characteristics associated with a particular aspect of the activity simulated by the game of the invention. For example, when a game of baseball is to be simulated, each game piece stores statistics associated with either a single player or a whole team of past or present major league baseball players.

The game pieces mate with a game board which contains means for electrically coupling signals to and from each piece. Also, to provide a degree of realism, the game board carries indicia descriptive of the activity to be simulated by the game of the invention. In a preferred embodiment, where the electronic game is to simulate the game of baseball, the game board carries indicia representing a baseball diamond. A different indicia would be provided for a different type of activity to be simulated.

The game pieces are coupled, via the game board, to an electronic control unit containing video game circuitry in the form of a processor and an associated game memory. The processor executes the instructions in the game memory, which typically takes the form of a detachable memory cartridge, to simulate a particular activity, such as baseball. In the course of simulating the particular activity, the processor reads data contained in each intelligent game piece in order to establish the characteristics of the simulated activity. In the case when a game of baseball is being simulated, the processor reads each game piece to obtain the baseball statistics stored thereby. In addition to receiving information from each of the game pieces, the console also receives signals from one or more players through an operator control (e.g., a joystick) to allow each player to interact (play) the simulated game, the results of which are displayed on a display device, such as a conventional home television set. The memory within each game piece is re-programmable so that by re-programming the memory in the game piece, or by substituting another game piece, the playing characteristics of the game can be changed without a need to change the instructions in the game memory.

DETAILED DESCRIPTION

Figure 1:
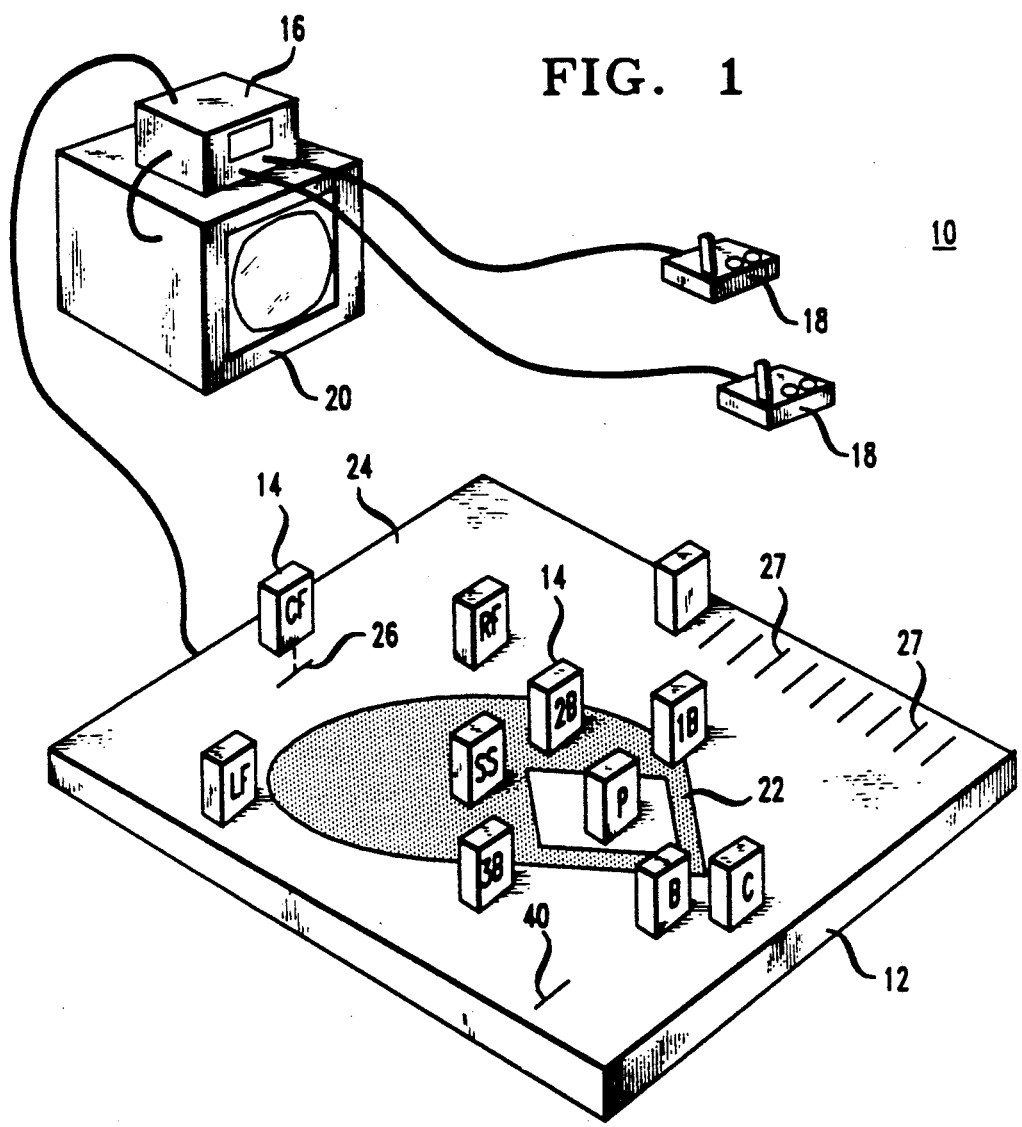
FIG. 1 is a block diagram of an electronic game in accordance with a first embodiment of the invention.

FIG. 1 illustrates a first preferred embodiment of an electronic game 10, in accordance with the invention for simulating (i.e., playing) an activity (i.e., a game). The game 10 comprises a game board 12; at least one, and preferably, a plurality of game pieces 14, each storing data and each being re-programmable; a console 16 containing video game circuitry (described with respect to FIG. 6); and at least one, and preferably two, operator controls 18. The game 10 utilizes a conventional raster scan display device 20 for displaying images and producing sound associated with the game being played by the game 10. The display device 20, which typically takes the form of a home television set, does not comprise part of the invention per se.

In a first preferred embodiment of the invention, the game board 12 takes the form of a box having indicia 22 on its upper surface 24, the indicia representing the playing field of the game to be played by the game 10. In the illustrated embodiment, the game to be played is baseball so that the indicia 22 depict a baseball diamond. As will be appreciated, other activities, either sports, mysteries or adventures, for example, are capable of being played by the game 10, and thus, for an activity other than baseball, an indicia 22 different from the baseball diamond shown in FIG. 1 would be depicted.

Each of the game pieces 14 represents a separate player associated with the game being simulated. In the illustrated embodiment, with baseball being the simulated game, each game piece 14 represents an individual baseball player, typically a current or past major league baseball player whose statistics are electronically stored in the game piece in a manner described hereinafter. Since the game of baseball is typically played with two teams of nine players each, the game 10 includes two sets (i.e., "teams") of nine game pieces 14 apiece. An additional game piece 14 could be added to each team to serve as a designated hitter if desired. Each game piece 14 of each team serves alternately as a batter (when the player's team is batting), and as a fielder, taking on one of the following fielding positions: P (pitcher), C (catcher), 1B (first base), 2B (second base), SS (short stop) 3B (third base), RF (right field) CF (center field) and LF (left field). It should be understood that each team of nine game pieces 14 could alternatively be represented by a single game piece (not shown) which would store the statistics for the players on that team. In such a case, the game 10 would include two "team" game pieces 14 rather than eighteen separate "player" game pieces.

In the illustrated embodiment of FIG. 1, each game piece 14 is comprised of a rectangular personal data card whose details will be described below with respect to FIG. 2. When configured of a personal data card, the game piece 14 ultimately mates with the game board 12 by seating in a separate one of a first and second set of slots 26 and 27 of FIG. 1. The slots 26 are arranged about the baseball diamond 22 so that the position of each slot corresponds to one of the positions typically played by a separate one of the nine players of a baseball team in the field (i.e., the "fielding" team) and the position occupied by the batter of a "batting" team. The slots 27 are arranged adjacent to one of the sides of the top surface 24 of the game board 12 to store the remaining pieces 14 of the batting team. As should be appreciated, if two "team" game pieces (not shown) were substituted in place of the eighteen separate "player" game pieces 14 shown in FIG. 1, only two slots 26 would be provided and the storage slots 27 could be eliminated.

Figure 2:
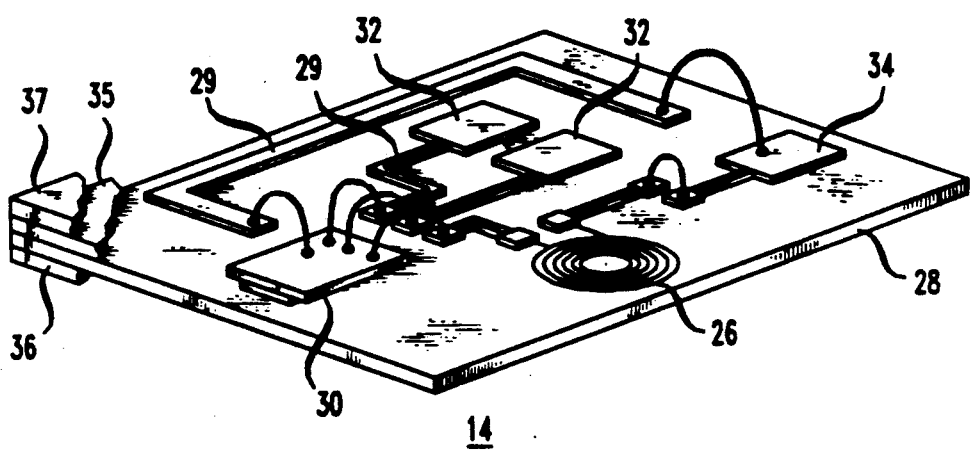
FIG. 2 is a cutaway perspective view of a game piece of the game of FIG. 1.

Referring to FIG. 2, when configured of a personal data card, each game piece 14 of FIG. 2 is comprised of a first substrate 28, typically fabricated from a either a MYLAR film or a circuit board material such as FR-4 or the like. The substrate 28 has a plurality of metallized traces 29 on a first of its major surfaces. At least two of the traces 29 couple a re-programmable semiconductor memory device 30, typically in the form of an Electrically Erasable, Programmable, Read-Only Memory (EEPROM), secured to the substrate 28, to a pair of metallized areas 32. The areas 32 on the substrate 28 serve as capacitive plates for capacitively coupling data from the memory device 30 to the console 16 of FIG. 1 in a serial fashion. In addition to the memory device 30, the substrate 28 also carries a coil 33 which is coupled by one or more of the metallized traces 29 and one or more wire bonds to an analog circuit chip 34. The chip 34 contains a rectifier and voltage regulator (not shown) for rectifying an ac voltage induced in the coil 33 to produce dc which is supplied to the memory device 30.

Overlying the substrate 28 is a cover layer 35 (only a portion of which is shown) formed from a plastic resin. The cover layer 35 has a set of openings in it (not shown) to accommodate the memory device 30, the coil 33 and the chip 34. Typically, the memory device 30, the coil 33 and the analog chip are sealed within the openings in the cover layer 35 by a potting compound (not shown) deposited into the openings after the cover layer has been placed on the substrate 28. The back and front exposed surfaces of the substrate 28 and the cover layer 35, respectively, are covered by a separate one of a pair of labels 36 and 37, respectively. One or both of the labels 36 and 37 is typically printed with indicia (not shown) depicting the image of the baseball player whose statistics are stored by the memory chip 30.

Figure 3:
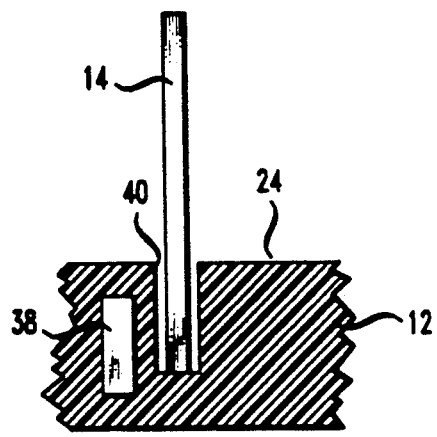
FIG. 3 is partial cross-sectional view of a portion of the game piece of FIG. 2 shown in mating relationship with a game board of the game of FIG. 1.

Referring to FIG. 3, within the game board 12 is at least one card reader 38 which is coupled to the console 16 of FIG. 1. The card reader 38 includes a set of capacitive plates (not shown) for capacitively coupling with the plates 32 of FIG. 2 to permit data stored in the memory 30 of FIG. 2 to be read therefrom. In addition, the reader 38 of FIG. 3 also includes a power transformer primary (not shown) of the type disclosed in U.S. Pat. No. 4,692,064, issued on Sep. 9, 1987, to R. L. Billings and assigned to AT&T, for inducing an ac voltage in the coil 33 of FIG. 2. In a preferred embodiment, the reader 38 is seated in the game board 12 adjacent to a slot 40, which, as seen in FIG. 1, is situated on the opposite side of the baseball diamond 22 from the slots 27.

Each game piece 14 is "read" by the reader 38 when the piece is placed in the slot 40 for a short time (e.g., a few seconds) so that data stored in the memory 30 can be transferred to the circuitry (see FIG. 5) in the console 16 of FIG. 1. After each game piece 14 is read, the game piece is placed in a separate one of the slots 26 and 27 of FIG. 1 as appropriate. In the illustrated embodiment, where a game of baseball is to be played, the order in which each of the nine game pieces 14 of each team is read establishes the batting order of the players on that team. Typically, the "fielding" position of a player, represented by a corresponding one of the game pieces 14, is established by the information stored by the memory device 30 (see FIG. 2) in each piece.

Instead of providing the game board 12 with the single reader 38 adjacent the slot 40, each of the slots 26 and 27 could themselves each be provided with a reader. While providing multiple readers 38 would facilitate faster data entry, the advantage obtained by multiple readers 38 would likely not outweigh the cost.

As thus described, the reader 38 functions to read the data stored in the memory device 30 of FIG. 2 of the game piece 14 of FIG. 1. In addition, the reader 38 in the game board 12 of FIG. 3, or another reader (not shown) located remote from the board, could also be employed to enter new information (i.e., re-program) the memory device 30 of FIG. 2 in the game piece 14 of FIG. 1 as desired, either from information contained in the circuitry in the console 16, or from data stored at a remote computer (not shown).

Figure 4:
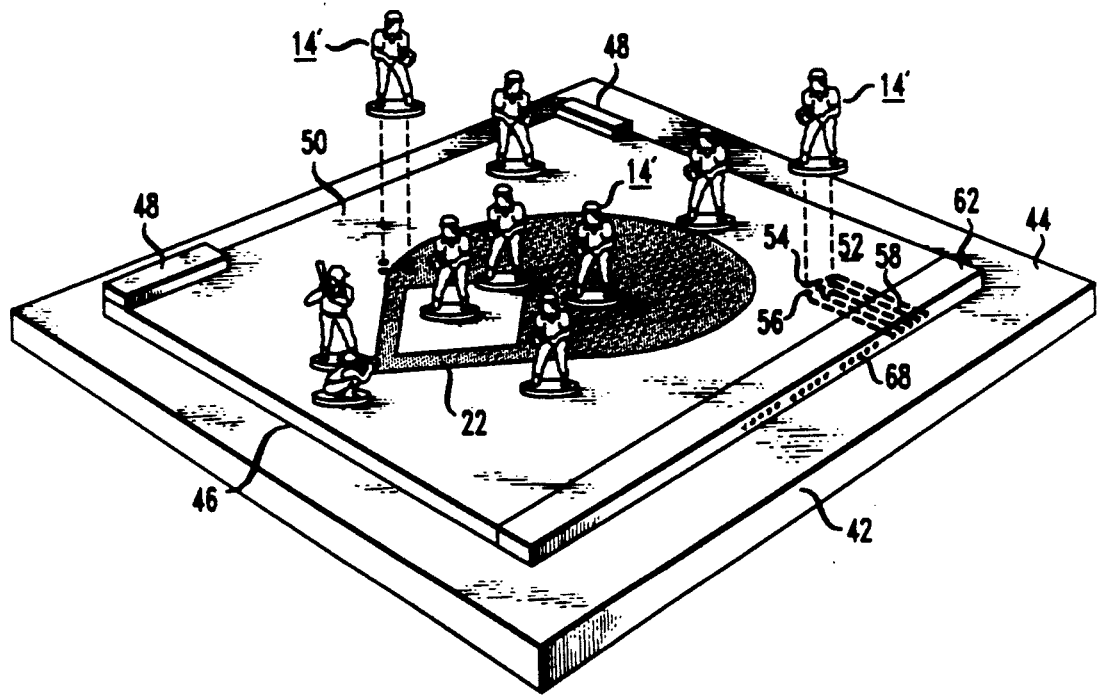
FIG. 4 a perspective view of an alternate preferred embodiment of a game board and game piece of the game of FIG. 1.

Referring to FIG. 4, there is shown an alternate embodiment of a game board 12' and a game piece 14' for the game 10 (see FIG. 1). The game board 12' of FIG. 4 includes a planar member 42, typically a substrate, having an upper major surface 44 which is ferromagnetic. Further, the game board 12' also includes a circuit member 46, generally taking the form of a sheet of MYLAR film or the like. The circuit member 46 typically has one or more magnets 48 adhered to its upper surface 50 by an adhesive or a mechanical fastener (not shown) to allow the circuit member 46 to be firmly held in place on the surface 44 of the member 42, yet be removed as desired.

Figure 5:
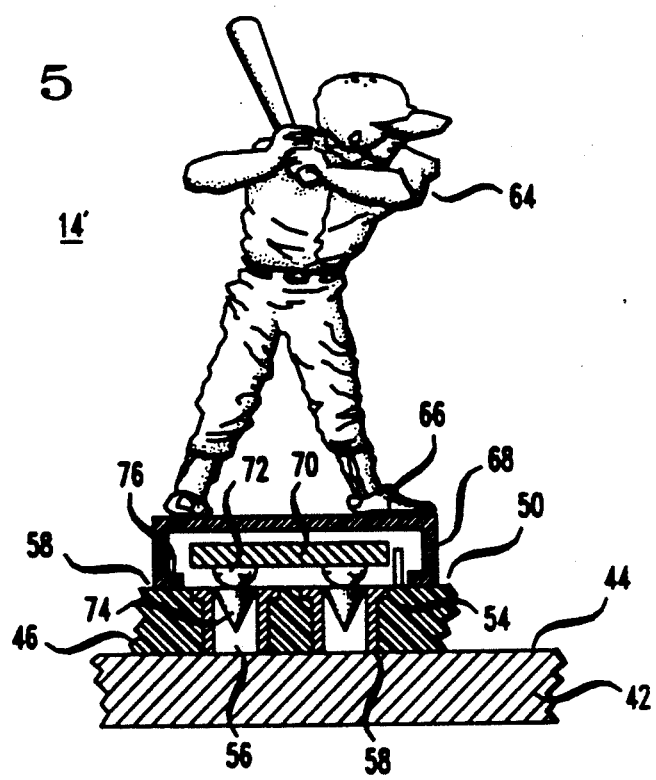
FIG. 5 is a cross-sectional view a portion of the game board and game piece shown in FIG. 4.

The circuit member 46 has a plurality of patterns 52 of metallized areas 54 on its major surface 50 for making an electrical connection with each game piece 14' in a manner described below. As will be appreciated hereinafter, there are typically five separate metallized areas 54 in each pattern 52. Each metallized area 54 of each pattern 52 typically takes the form of a ring of metallization which surrounds a through-hole (i.e., an aperture) 56 in the circuit member 46. As best seen in FIG. 5, the wall of each aperture 56 has a layer of metallization 58 thereon which is integral with the metallized area 54.

The patterns 52 of metallized areas 54 may be established on the surface 50 of the circuit member 46 in a variety of ways. For example, the patterns 52 of metallized areas 54 could be established by stencil printing a conductive ink onto the surface 50. Alternatively, the patterns 52 could be established by first cladding the surface 50 of the circuit member 46 with metallization and then photolithographically patterning the metallization by conventional methods.

As best seen in FIG. 4, each metallized area 54 in each pattern 52 is connected by an integral metallized trace 58 on the surface 50 of the circuit member 46 to a separate pin 60 of an edge connector 62 attached to one edge of the circuit member. A cable 63 (see FIG. 6), having a connector (not shown) complementary to the edge connector 62, serves to connect each pin 60 to the circuitry in the console 16 of FIG. 1.

Referring to FIG. 5, each game piece 14' takes the form of a figurine 64 (i.e., statue), which, when a game of baseball is to be played, depicts a baseball player. Obviously, if another type of activity were to be simulated, the figurine would be representative of a player associated with such activity. The figurine 64 is attached at its base to a lid 66 which overlies the opening of a non-ferromagnetic enclosure 68, typically made from plastic or the like. Seated within the enclosure 68 is a re-programmable memory device 70 (i.e., an EEPROM chip or the like) which stores statistics about the player represented by the figurine 64. The memory chip 70 is electrically connected, via each of a set of solder bumps 72, to a separate one of a set of pins 74 which protrude through the bottom inside surface of the enclosure 68 so as to depend below the enclosure.

The pins 74 are arranged the same as, and are adapted for receipt in, the apertures 56 associated with the metallized areas 54 of each pattern 52 (see FIG. 4). In practice, there are typically five pins 74 associated with each game piece 74, each pin separately serving as a ground return path (GND), a data path (DATA), a power conductor (VCC), an enable signal path (ENABLE) and a clock signal path (CLK). In this way, VCC, GND, DATA, ENABLE and CLK signals can be coupled to/from the memory device 72 of FIG. 5 when the pins 74 mate with the corresponding apertures 56 in a pattern 52 to facilitate data retrieval from the device.

As best seen in FIG. 5, one or more magnets 76 are adhered, typically by adhesive, to the bottom inside surface of the enclosure 68 for detachably holding the game piece 14' in place on the surface 44 of the circuit member 46 when the pins 76 are received in the apertures 56. In this way, each game piece 14' is firmly held in place on the game board 12' of FIG. 5 during the playing of a game, yet the piece can be easily be removed after playing for subsequent storage.

The game pieces 14' of FIGS. 4 and 5 can be re-programmed through the circuit member 46, or by a separate off-line facility capable of making an electrical connection with each of the pins 74 of each game piece. During re-programming, the ENABLE signal would typically be held at a logic "1" level to signal that a write operation was being performed on the memory device 70, while during game playing, the ENABLE signal would be held to a logic "0" to signal that the memory device 70 will be read.

The game board 12' and game piece 14' of FIGS. 4 and 5 offer a distinct cost advantage over the game board 12 and game piece 14 of FIG. 1. The game board 12 of FIG. 1 must be configured specifically for the activity (game) to be played whereas the planar member 42 of the game board 12' may be used universally. While the circuit member 46 must be configured specifically for the game or activity to be played, the circuit member can usually be fabricated quite cheaply, particularly as compared to the cost of the combination of the game board 12 and the reader 38 of FIG. 3.

Figure 6:
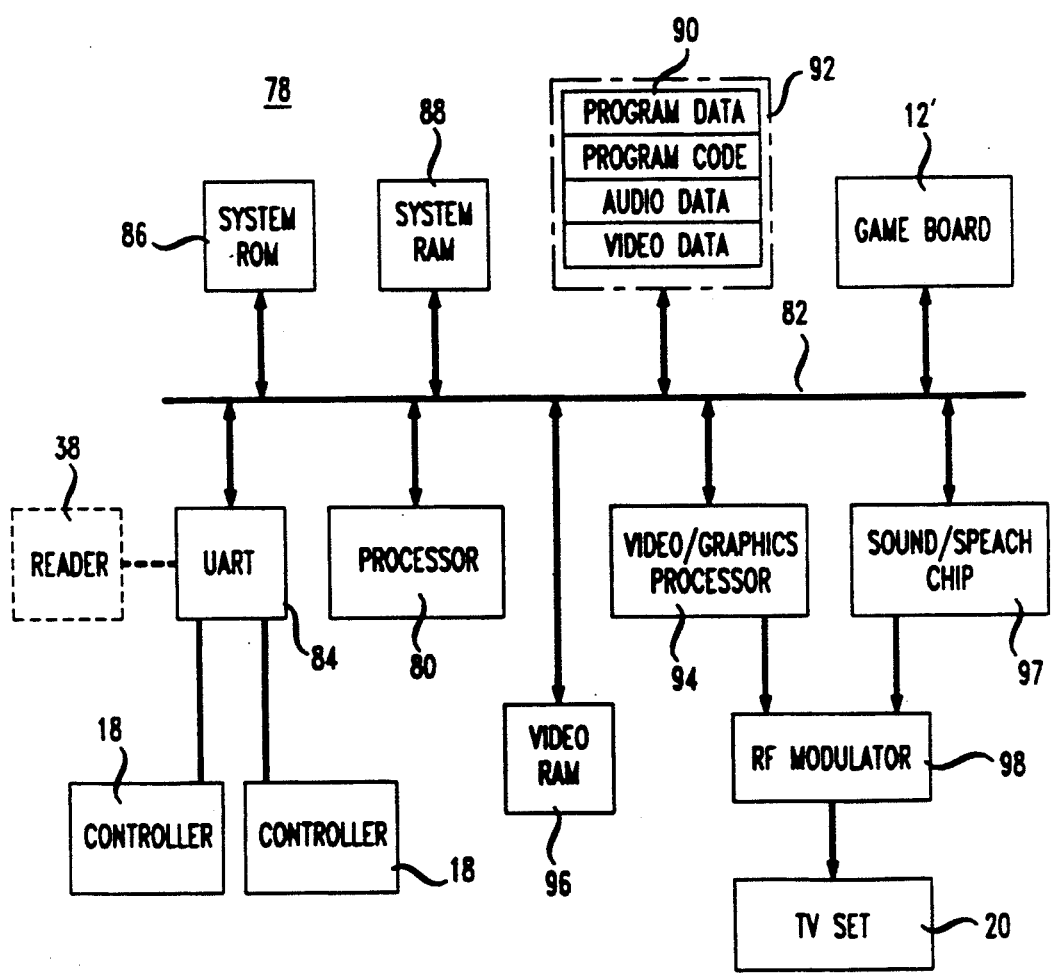
FIG. 6 is a block schematic diagram of circuitry within an electronic console comprising a portion of the game of FIG. 1.

Referring to FIG. 6, there is shown a block schematic of a video game circuit 78 contained within the console 16 (see FIG. 1) for simulating (playing) a selected activity (game). At the heart of the video game circuit 78 of FIG. 4 is a microprocessor 80, coupled through a bus 82 to a device controller 84, typically taking the form of a Uniform Asynchronous Receive/Transmit (UART) circuit, which serves to interface each of the operator controllers 18 to the processor 80. In addition, the UART 84 also serves to couple the reader 38 of FIG. 3 to the processor 80 when game board 12 and game pieces 14 are employed.

The bus 82 also serves to couple the processor 80 to a Read Only Memory (ROM) 86, referred to as a "system ROM," which stores a set of instructions which are executed by the processor to control the overall operation of the game 10 of FIG. 1. The processor 80 is also coupled via the bus 82 to a Random Access Memory 88, referred to as the "system RAM", which functions to temporarily store information generated by the processor during operation.

In addition to the memories 86 and 88, the processor 80 is also coupled by the bus 82 to a game memory 90 which contains program data, program code (instructions), audio data and video data specific to a particular game to be played. In practice, the game memory 90 is housed within a cartridge 92 which is designed for receipt in the console 16 of FIG. 1 to allow the game memory to be detachably coupled to the bus 82. In this way, a different game memory 90 with instructions and data for a different game, may be substituted. As will be discussed in greater detail with respect to FIG. 7, the contents of the game memory 90 of the illustrated embodiment enable the processor 80 to play a game of baseball.

When the game board 12' and game pieces 14' of FIGS. 4 and 5 are substituted for those of FIGS. 1-3, the pins 60 of the edge connector 62 of FIG. 4 are connected through the cable 63 of FIG. 6 to the bus 82. To reduce the number of physical conductors within the cable 63, it may be desirable to provide some type of decoder (not shown) at the game board 12' of FIG. 4 which would allow multiplexing of signals supplied to the circuit member 46 of FIG. 1

Rather than couple the game board 12' directly to the bus 82 via the cable 63, it may be desirable in some instances to provide a mechanism (not shown) associated with the game cartridge 92 to enable the game board to be coupled to the program memory 90. In this way, the processor 80 would, as a consequence of reading the game memory 90, read the contents of each game piece 14' of FIGS. 4 and 5. The advantage to coupling the game board 12' to the game memory 90 is that the combination of the game board 12' and the game memory 90 may be utilized with a conventional video game such as the NINTENDO, ATARI or SEGA video games.

Referring to FIG. 6, a video-type Random Access Memory (RAM) 96 is coupled to the processor 80 through the bus 82. The video RAM 96 serves as a high-speed storage device for storing video information generated by the processor 80 during execution of the game program in the game memory 90. The video information stored by the video RAM 96 is shared, via the bus 82, with a video/graphics processor 94, typically a special purpose processor specifically designed for manipulating video information. A sound/speech chip 96 is also coupled to the bus 82 for generating audio signals in accordance with data received from the processor 80. The video/graphics processor 94 and the sound/speech chip each have their outputs coupled to an RF modulator 98 which serves to modulate a video signal output by the graphics processor, and an audio signal from the speech/sound chip with an RF carrier to produce an RF signal for input to the TV set 20 of FIG. 1.

Figure 7:
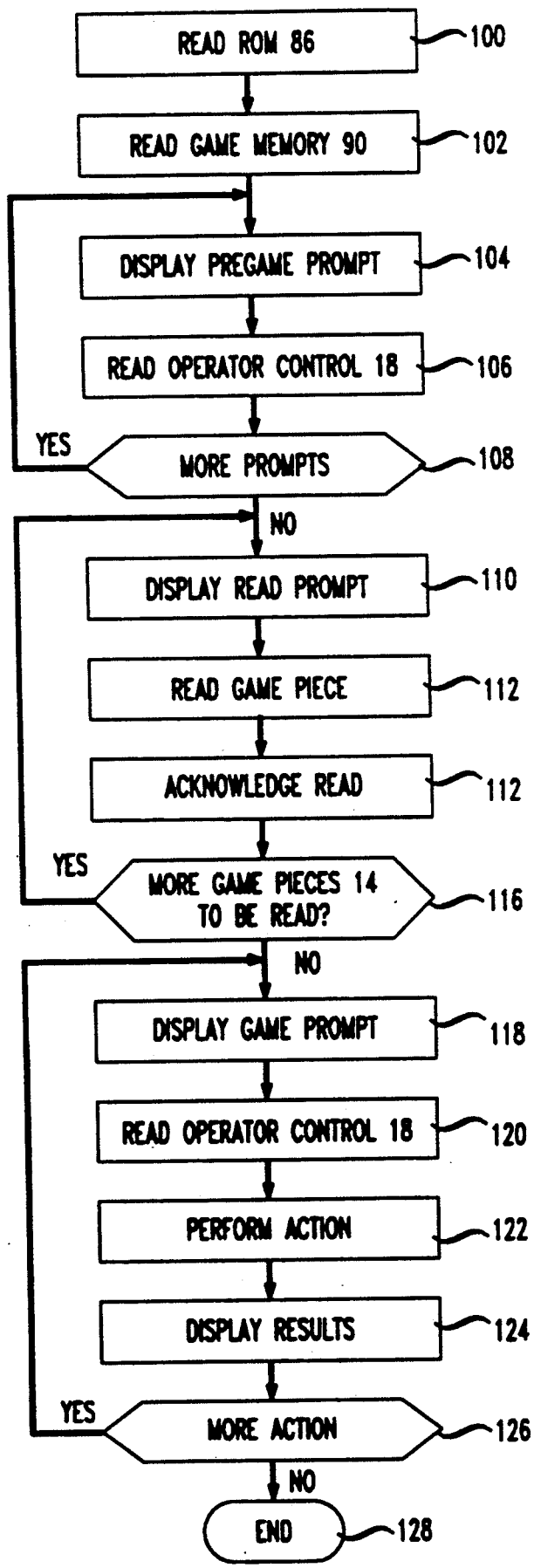
FIG. 7 is a flowchart diagram of a program executed by the circuitry of FIG. 6 to simulate an activity.

FIG. 7 is a flowchart representation of the overall steps executed by the processor 80 in the console 16 of FIG. 1 to play a game. Upon power-up, that is, when the circuitry 78 of FIG. 6 is first energized, the processor 80 of FIG. 6 first reads the system ROM 86 of FIG. 4, which, as indicated, contains instructions for the overall operation of the circuitry 78 (step 100). After reading the system ROM 86 of FIG. 4, the processor 80 then executes the instructions contained in that ROM, including an instruction for reading the game memory 90 of FIG. 4 (step 102). As indicated previously, the game memory 90 contains program data and instructions, as well as audio and video data for causing the processor 80 to play a game, which, in the illustrated embodiment, is the game of baseball.

After the game program memory 90 is read, then the program code (instructions) are sequentially executed. Typically, the first program instruction in the game memory 90 (step 104) causes the processor 80 to display a first pre-game prompt message on the television set 20 of FIG. 1 to identify the game being played and to solicit a first pre-game input from a player, which input the player enters through the operator control 18. Following display of the pre-game prompt, the processor 80 of FIG. 4 then "reads" the player-entered input (step 106) via the UART circuit 84 of FIG. 6.

Thereafter, a check is made (step 108) to determine whether any additional player inputs are required, thus requiring more prompt messages. Depending on the game to be played, more than one player-entered, pre-game input may be necessary. For example, in the case of the game of baseball, an input is usually required to determine if a designated hitter is to be used. Other pre-game inputs may be required as well. If a determination is made during step 108 that additional pre-game inputs are necessary, then step 104 and those following it are re-executed so that the next successive pre-game prompt message is displayed and the correspondingly solicited player pre-game input is entered.

Should no further pre-game prompt message be required, then, following step 108, a read prompt message is displayed (step 110), prompting a player to successively place the game pieces 14 of FIG. 3 into the slot of FIG. 3 so that the piece can be read by the reader 38 of FIG. 3. (For the alternative preferred game board 12' and game piece 14' embodiments, the read prompt would simply be informational in nature, rather than actually prompt the player to take some action, since reading of the gaming pieces 14' is carried out without any player intervention.) Following display of the read prompt during step 110, step 112 is executed and a successive one of the game pieces 14 of FIGS. 1 and 3 (or a successive one of the game pieces 14' of FIGS. 4 and 5) is read. Once a successive one of the game pieces 14 (or 14') is read, step 114 is executed and an acknowledgement, either in the form or an aural or visual indication, is provided to signal that the game piece has indeed been read.

After step 114, a check is made to determine whether additional games pieces 14 are to be read (step 116). The number of game pieces 14 to be read depends on the nature of the game being played. In the illustrated embodiment, where the game of baseball is being played with eighteen separate game pieces 14 (or 14'), eighteen separate read operations must be carried out, so that step 110 and those following it are executed eighteen times. As may be appreciated, a different game may require a larger or smaller number of game pieces 14 (or 14') and hence, a greater or smaller number of read operations.

Once all of the game pieces 14 (or 14') have been read, then the actual playing of the game is commenced, and a first game prompt is displayed (step 118) to prompt a player to take a certain action. In the illustrated embodiment where the game 10 of FIG. 1 is to play baseball, the game prompt displayed during initial execution of step 118 would prompt a player whose team is in the field to select a particular pitch to be thrown, e.g., fastball, sinker, slider, etc. The game prompt displayed would typically include information, stored by the game piece 14 designated as the pitcher, reflecting the statistics associated with each possible type of pitch thrown by the pitcher represented by the game piece.

Following display of the game prompt message during step 118, the processor 80 of FIG. 6 then reads the operator control 18 during step 120 to obtain the player command entered in response to the game prompt message. After reading the operator control 18 during step 120, the processor 80 performs an action (step 122) in accordance with the previously entered player input. In the case where the player-entered input was to select a particular pitch to be thrown, then the action performed during step 122 would be to simulate the throwing of the selected pitch. The results of the action performed during step 122 are displayed during step 124. Also, any sounds descriptive of the action will be reproduced during step 124.

Following step 124, a check is made during step 126 to determine whether more actions are to be performed. In the case where the previous action taken during step 122 was to simulate the throwing of a pitch, such an action would likely be followed by a batter attempting to hit the simulated pitch. Under these conditions, step 118 would be re-executed and the next game prompt would be displayed. In the case where the action taken previously during step 122 was the throwing of a pitch, the game prompt displayed during subsequent re-execution of step 118 would likely take the form of a message prompting the other player to select how his game piece 14 (or 14'), currently designated as the batting player in the appropriate "lefty" or "righty" batting position, would hit the incoming pitch (swing, bunt or hit-away for example) or not swing. Such a game prompt would also include a display of the appropriate batting statistics of the "batting" game piece 14.

After step 118 is re-executed, step 120 is re-executed and the operator control 18 of FIG. 1 associated with the second (e.g., "batting") player is read. Step 122 is then re-executed and the processor 80 of FIG. 6 performs another action. In the case of where the game being played is the game of baseball, the action taken by the processor 80 during the current execution of step 122 would be to simulate the hitting by the current "batting" game piece of the thrown pitch. Whether the batting game piece 14 hit the thrown pitch, and the type of hit, would be established by the processor 80 of FIG. 6 using the batting statistics stored by the batting game piece.

The re-execution of steps 118-126 continues as long as there are additional actions to be performed. When there are no further actions to be performed, as would occur in the simulated baseball game when the batting team, who trails the fielding team, makes the last out in the last-half of the ninth inning, or scores a game winning run, then the game ends (Step 128).

It should be understood that the steps 100-128 of FIG. 7 are generic to any game to be simulated. The specific nature of the pre-game and game prompts generated during steps 103 and 118, respectively, and the specific action taken by the processor 80 of FIG. 6 are, of course, dependent on the nature of the game being played.

The foregoing describes an electronic game 10 which utilizes at least one, and preferably, a plurality of intelligent (i.e., re-programmable) game pieces 14, 14' for storing information indicative of certain characteristics of an activity (game) to be simulated (played) by the game.

It is to be understood that the above-described embodiments are merely illustrative of the principles of the invention. Various modifications and changes may be made thereto by those skilled in the art which will embody the principles of the invention and fall within the spirit and scope thereof.

We claim:

1. An electronic game comprising:
   at least one intelligent game piece providing a three-dimensional representation of at least one participant of an activity to be simulated and containing a re-programmable electronic memory for storing activity characteristics associated with the activity to be simulated;
   a game board for physically supporting each of a plurality of the game pieces and for coupling electrical signals thereto;
   an electronic control unit coupled to the game board for reading the electronic memory in each game piece supported by the game board to obtain the activity characteristics stored in each said game piece and for simulating an activity to be performed by at least one participant, the characteristics of the activity to be simulated being determined, at least in part, in accordance with the activity characteristics electronically stored in the electronic memory for each game piece; and
   at least one operator controller coupled to the control unit for enabling an operator to provide input to the control unit to allow the operator to perform the simulated activity.

2. The game according to claim 1 wherein each game piece is configured of a personal data card containing a semiconductor memory chip.

3. The game according to claim 2 wherein each game piece further includes:
   means for capacitively coupling data to the memory chip; and
   means for inductively coupling power to said chip.

4. The game according to claim 3 wherein the game board includes:
   at least one slot therein for receiving at least a portion of the game piece; and
   a reader positioned adjacent to the slot in the game board, and electrically coupled to the electronic control unit for coupling power to the game piece and for coupling data from the game piece to the control unit.

5. The game according to claim 1 wherein the game board carries indicia indicative of the activity being simulated.

6. The game according to claim 1 wherein each game piece comprises: a figurine symbolic of the activity being simulated;
   a hollow base for supporting the figurine;
   a semiconductor memory chip mounted within said base; and
   electrical contacts carried by the base for carrying signals to and from the memory chip.

7. The game according to claim 6 wherein each of the electrical contacts comprises a pin which depends from the base.

8. The game according to claim 1 wherein the game board comprises:
   a support having a flat surface;
   a circuit member having at least one pattern of metallized areas thereon, each metallized area in each pattern making an electric connection to the game piece;
   means carried by the circuit member for coupling signals between the metallized areas in each pattern and the electronic control unit; and
   means for detachably adhering the circuit member to the flat surface of the support.

9. The game according to claim 8 wherein the circuit member comprises a sheet of MYLAR film.

10. The game according to claim 1 wherein the electronic control unit comprises:
    a main processor;
    an input/output device for coupling signals from at least one operator control to the main processor;
    a system read-only memory coupled to the main processor and containing program instructions for controlling the overall operation of the main processor;
    a system random access memory coupled to the main processor for providing temporary storage therefor;
    a program memory detachably connected to the main processor for storing: program data associated with an activity to be simulated by the main processor, audio data indicative of the sounds associated with the activity to be simulated, video data indicative of images of the activity to be simulated, and program instructions for execution by the main processor for causing the main processor to simulate an activity;
    means for coupling information from each game piece to the main processor so that activity information stored in each piece may be accessed by the main processor in the course of simulating an activity to influence the characteristics thereof;

a video random access memory coupled to the main processor for storing video information;

a video/graphics processor coupled to the main processor for processing the video information stored in the video random access memory to generate a video signal indicative of images of the activity being simulated;

a speech/sound chip coupled to the main processor for processing audio information indicative of sounds of the activity to be simulated to yield an audio signal; and an RF modulator for modulating the video and audio signals of the video/graphics processor and the audio signal from the sound/speech chip.

11. An electronic game comprising:

at least one game piece physically symbolizing an activity to be simulated and containing a re-programmable electronic memory for electronically storing activity characteristics associated with a game to be simulated;

a game board including:
   a support having a flat surface which is ferromagnetic; a circuit member having at least one pattern of metallized areas thereon, each metallized area in each pattern making an electrical connection to one of the game pieces;
   means carried by the circuit member for coupling signals to the metallized areas; and
   at least one magnet for detachably adhering the circuit member to the flat surface of the support;

an electronic control unit coupled to the game board for reading the activity characteristics stored in each game piece and for simulating an activity to be performed by at least one player, the characteristics of the activity to be simulated being determined, at least in part, in accordance with the activity characteristics stored in each game piece; and at least one operator controller coupled to the electronic control unit for enabling an operator to provide input to the control unit to allow the operator to perform the simulated activity.

12. In combination with a video game containing a processor and at least one memory containing program data indicative of an activity to be simulated and program instructions which are executed by the processor to simulate the activity in accordance with the program data, the improvement comprising:

at least one intelligent game piece providing a three-dimensional representation of at least one participant of the activity to be simulated and containing an electronic re-programmable memory chip for storing activity characteristics associated with the activity to be simulated, which memory is read by the processor to obtain the activity characteristics;

a game board for physically supporting each of a plurality of the game pieces and for electrically coupling the memory chip in each game piece to the processor.

13. The game according to claim 12 wherein each game piece is configured of a personal data card.

14. The game according to claim 13 wherein each game piece further includes:
   means for capacitively coupling data to the memory chip; and
   means for inductively coupling power to said chip.

15. The game according to claim 14 wherein the game board includes:
   at least one slot therein for receiving at least a portion of the game piece; and
   a reader positioned adjacent to the slot in the game board, and electrically coupled to the electronic console for coupling power to the game piece and for coupling data from the game piece to the console.

16. The game according to claim 12 wherein the game board carries indicia indicative of the activity being simulated.

17. The game according to claim 12 wherein each game piece comprises:
   a figurine symbolic of the activity being simulated;
   a hollow base for supporting the figurine;
   a semiconductor memory chip mounted within said base; and
   electrical contacts carried by the base for carrying signals to and from the memory chip.

18. The game according to claim 17 wherein each of the electrical contacts comprises a pin which depends from the base.

19. The same according to claim 12 wherein the game board comprises:
   a support having a flat surface;
   a circuit member having at least one pattern of metallized areas thereon, each metallized area in each pattern making an electrical connection to a game piece;
   means carried by the circuit member for coupling signals between the metallized area in each pattern and the electronic control unit; and
   means for detachably adhering the circuit member to the flat surface of the support.

20. In combination with a video game containing a processor and least one memory containing program data indicative of an activity to be simulated and program instructions which are executed by the processor to simulate the activity in accordance with the program data, the improvement comprising:

at least one game piece, physically symbolizing an activity to be simulated, and containing a re-programmable electronic memory chip for electronically storing characteristics of the activity to be simulated, which characteristics are read by the processor; and a game board for coupling each game piece to the processor, the game board including:
   a support having a flat surface which is ferromagnetic;
   a circuit member having at least one pattern of metallized areas thereon, each metallized area in each pattern making an electrical connection to one of the game pieces;
   means carried by the circuit member for coupling signals between the metallized area and the processor; and
   at least one magnet for detachably adhering the circuit member to the flat surface of the support.

21. The game according to claim 20 wherein the circuit member comprises a sheet of MYLAR film.

22. A method of playing a video game comprising the steps of
   (a) providing at least one game piece having a first electronic memory which is reprogrammable and which is pre-programmed to contain data representative of characteristics associated with an activity to be simulated;

(b) providing a second memory containing program instructions for performing actions in accordance with user commands and in accordance with the activity characteristics stored in the first memory.

(c) electronically reading the first memory in each game piece to obtain the activity characteristics stored therein;

(d) reading the second memory to obtain the program instructions stored therein;

(e) displaying at least one prompt message to prompt an operator to enter a user-command;

(f) reading the user-entered command;

(g) performing an action in accordance with the instructions contained in the second program memory and in accordance with the activity characteristics stored in the first memory;

(h) displaying the results of such action; and (i) repeating the steps of (e)–(h) until no more actions are to be taken.

* * * * *